(12) United States Patent
Saito (10) Patent No.: US 11,392,334 B2
(45) Date of Patent: Jul. 19, 2022

(54) INFORMATION PROCESSING APPARATUS, IMAGE FORMATION APPARATUS, AND CONTROL METHODS OF INFORMATION PROCESSING APPARATUS FOR SETTING A DEFAULT PRINTER

(71) Applicant: CANON KABUSHIKI KAISHA, Tokyo (JP)

(72) Inventor: Kazuyuki Saito, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/156,390

(22) Filed: Jan. 22, 2021

(65) Prior Publication Data
US 2021/0240418 A1     Aug. 5, 2021

(30) Foreign Application Priority Data

Jan. 30, 2020   (JP) .............................. JP2020-014209

(51) Int. Cl.
*G06F 3/12*   (2006.01)
*H04N 1/44*   (2006.01)

(52) U.S. Cl.
CPC .......... *G06F 3/1238* (2013.01); *G06F 3/1222* (2013.01); *G06F 3/1292* (2013.01); *H04N 1/4413* (2013.01)

(58) Field of Classification Search
None
See application file for complete search history.

(56) References Cited

U.S. PATENT DOCUMENTS

| 2006/0180659 | A1* | 8/2006 | Loffredo | G06F 3/1285 235/380 |
| 2008/0204798 | A1* | 8/2008 | Taniguchi | G06F 3/1226 358/1.15 |
| 2017/0199710 | A1* | 7/2017 | Ando | G06F 3/1274 |

FOREIGN PATENT DOCUMENTS

JP    2015-108950 A    6/2015

OTHER PUBLICATIONS

English translation of Japanese Application 2013-251194 (corresponding to Japanese Publication 2015-108950). (Year: 2013).*

* cited by examiner

*Primary Examiner* — Thomas D Lee
(74) *Attorney, Agent, or Firm* — Canon U.S.A., Inc. IP Division

(57) ABSTRACT

A default image formation apparatus is desired to be easily set. An information processing apparatus includes a controller including a processor and a memory, the controller configured to acquire identification information that identifies an image formation apparatus, and transmit the identification information to a server system in which the identification information about the image formation apparatus is previously registered so as to set the image formation apparatus as a default image formation apparatus in the server system.

9 Claims, 13 Drawing Sheets

| SHARED DEVICE LIST |
|---|
| ID123 |
| ID124 |
| ID125 |
| . . . |
| ID221 |
| ID222 |
| . . . |
| ID456 |
| . . . |

FIG.8B

| INDIVIDUAL DEVICE LIST (USER A) ||
|---|---|
| DEVICE UNIQUE ID | DEFAULT PRINTER |
| ID123 | OFF |
| ID222 | OFF |
| ID456 | ON |

INFORMATION PROCESSING APPARATUS, IMAGE FORMATION APPARATUS, AND CONTROL METHODS OF INFORMATION PROCESSING APPARATUS FOR SETTING A DEFAULT PRINTER

BACKGROUND

Field of the Disclosure

The present disclosure relates to a default setting of an image formation apparatus registered in a server system.

Description of the Related Art

With the widespread use of cloud services, more printing apparatuses have been equipped with network communication functions. In addition, there have been provided cloud print services in which users give print instructions from their terminals through the Internet. A user can log in to a cloud print service on the Internet from a terminal and print with a printer registered in the cloud print service. However, printers registered in such a cloud print service are located in various places. If many printers are registered in the cloud print service, the user needs to select a desired printer from these printers. Japanese Patent Application Laid-Open No. 2015-108950 discusses a method in which a terminal of a user reads an image code of a printer that the user wishes to use. By reading this image code, the user terminal is notified of a physical printer identification (ID) given to the printer by a cloud print server. Next, to use this printer, the user sends a setting request including the physical printer ID and his/her user ID to the cloud print service.

SUMMARY

According to embodiments of the present disclosure, an information processing apparatus includes a controller including a processor and a memory, the controller configured to acquire identification information that identifies an image formation apparatus, and transmit the identification information to a server system in which the identification information about the image formation apparatus is previously registered so as to set the image formation apparatus as a default image formation apparatus in the server system. Thus, for example, a printer that a user usually uses, namely, "a default printer", can be set. This eliminates the need for an individual user who always uses the same printer to select the printer to use from the printers registered in the cloud print service every time.

Further features of the present disclosure will become apparent from the following description of exemplary embodiments with reference to the attached drawings.

DESCRIPTION OF THE EMBODIMENTS

Figure 1:
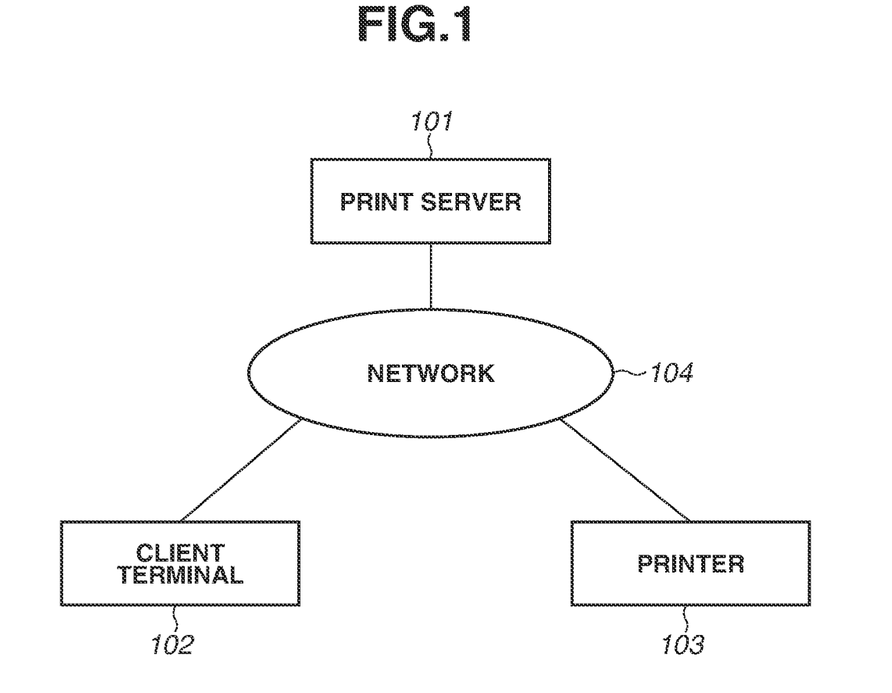
FIG. 1 illustrates a system configuration.

FIG. 1 illustrates a configuration of a bot system for printing according to a first exemplary embodiment.

A print server 101, a client terminal 102, and a printer 103 are connected to each other via a network 104. While FIG. 1 illustrates one client terminal 102 and one printer 103, in reality these elements are usually provided in plural. The server 101 may also be configured with a plurality of servers for load sharing. Alternatively, the roles of the individual servers may be virtually performed inside a physically single server. In addition, the individual server may be a cloud server on a cloud. The present exemplary embodiment assumes that the network 104 is a wide area network (WAN) such as the Internet. However, the network 104 may be a closed environment such as a corporate local area network (LAN). The client terminal 102 is a terminal directly operated by the user, such as a personal computer (PC), a tablet terminal, or a smartphone. Arbitrary application software is executable on the client terminal 102. The printer 103 is a device that actually performs printing on physical paper by converting print data received via the network 104 into image data. The print server 101 receives a print instruction and document data from the outside, converts the document data into print data, transmits the print data to the predetermined printer 103, and gives the print instruction to the printer 103. When deployed in a cloud environment, the print server 101 may be called a cloud print server. Either a push-type method or a pull-type method may be used. In the former method, the user does not need to perform any operation on the printer 103 to cause the printer 103 to perform printing. In the latter method, printing is not started unless the user performs a print start operation on the printer 103. The cloud server and the cloud print server are a server system that is constituted by at least one server. The printer is an image formation apparatus that forms images on sheets.

Next, hardware configurations of the above devices included in the system according to the present exemplary embodiment will be described with reference to FIGS. 2A to 2C.

Figure 2A:
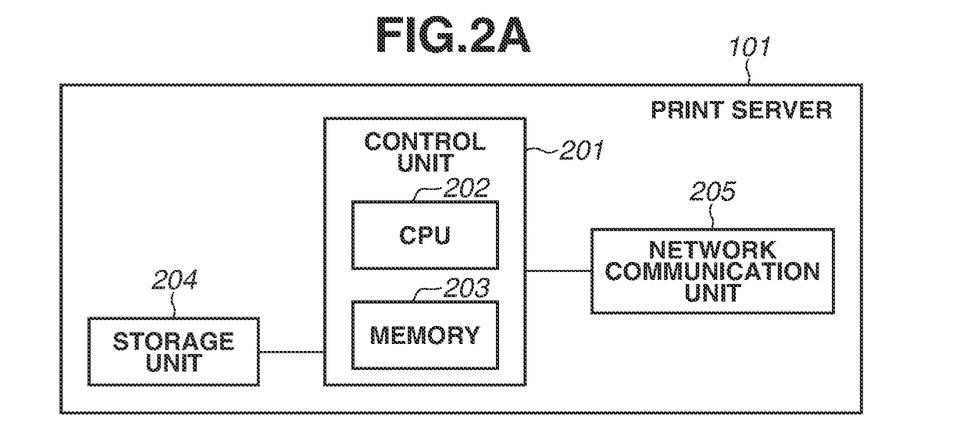
FIGS. 2A to 2C illustrate hardware configurations of a print server, a client terminal, and a printer.

FIG. 2A is a block diagram illustrating a hardware configuration of the print server 101. The print server 101 includes a storage unit 204, a control unit 201, and a network communication unit 205. The storage unit 204 is a nonvolatile storage device such as a hard disk or a solid-state drive (SSD) and is capable of holding and rewriting digital data.

The control unit 201 includes a central processing unit (CPU) and a memory 203 and controls an overall operation of the print server 101. The CPU 202 loads a program stored in the storage unit 204 to the memory 203 and executes the program. The memory 203 is a main memory of the CPU 202 and is used as a work area and a temporary storage area for loading various programs.

The network communication unit 205 communicates with the external network 104 and exchanges digital data with an external server, a client terminal, etc. via the network 104.

Figure 2B:
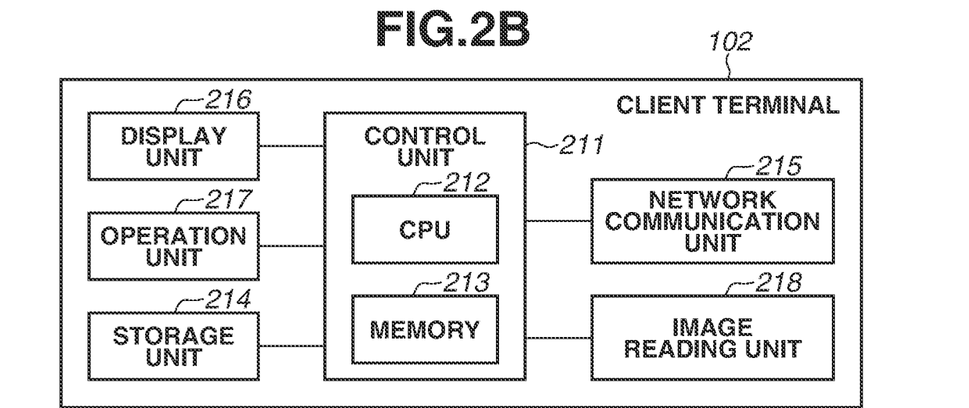

FIG. 2B is a block diagram illustrating a hardware configuration of the client terminal 102. The client terminal 102 includes a display unit 216, an operation unit 217, a storage unit 214, a control unit 211, a network communication unit 215, and an image reading unit 218. The display unit 216 is, for example, a liquid crystal display (LCD) and displays visual information to the user in real time. The operation unit 217 receives input information from the user via a keyboard, a mouse, or the like. A device, such as a touch panel that functions as both the display unit 216 and the operation unit 217, may be used as the operation unit 217.

The image reading unit 218 reads a two-dimensional code that is displayed on a panel of a device or that is attached to the housing of a device.

Since the storage unit 214, the control unit 211, and the network communication unit 215 are equivalent to those in the print server 101, redundant descriptions thereof will be avoided.

Figure 2C:
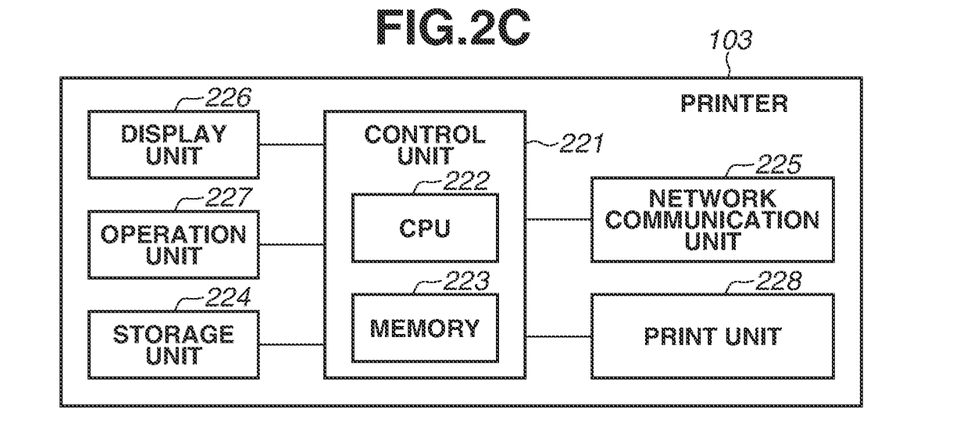

FIG. 2C is a block diagram illustrating a hardware configuration of the printer 103. The printer 103 includes a display unit 226, an operation unit 227, a storage unit 224, a control unit 221, a network communication unit 225, and a print unit 228. The display unit 226 is, for example, a touch panel or a light-emitting diode (LED) mounted on the printer 103 and displays information to the user in real time. The operation unit 227 receives input information from the user. In addition to the touch panel, the operation unit 227 may include hardware keys such as a numeric keypad. Since the storage unit 224 and the control unit 221 are equivalent to those in the print server 101, redundant descriptions thereof will be avoided. The network communication unit 225 communicates with the external network 104. The main role of the network communication unit 225 is receiving print data and transmitting, for example, the error status of the printer 103 to the external server, etc. The print unit 228 performs print processing by performing a series of operations on paper that has been set in a cassette or a tray. Examples of the print processing include paper feeding, printing, and paper discharging. Any printing method, for example, an electrophotographic method or an ink jet method, may be used. A double-sided unit used when the paper discharging is performed and finishing devices for stapling and punching are also included in the print unit 228. In the present exemplary embodiment, the single function printer that has only a print function has been described as the example of the printer 103. However, a multi-function printer (a multi-function peripheral) that has also a scanner function and a facsimile function may alternatively be used.

Next, software configurations of the above devices in the system according to the present exemplary embodiment will be described with reference to FIGS. 3A and 3B.

Figure 3A:
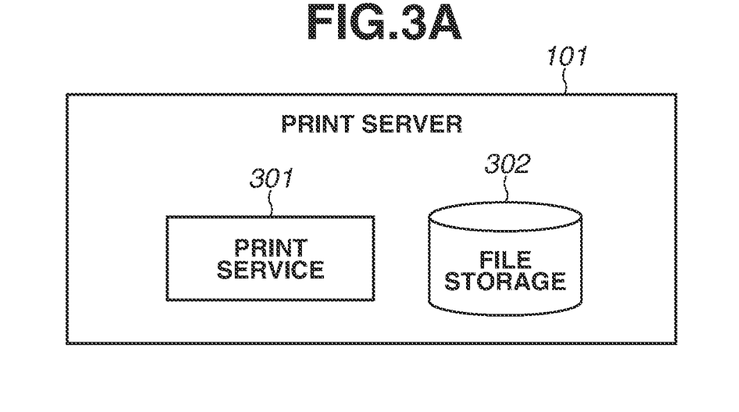
FIGS. 3A and 3B illustrate software configurations of the print server and the client terminal.
Figure 8A:
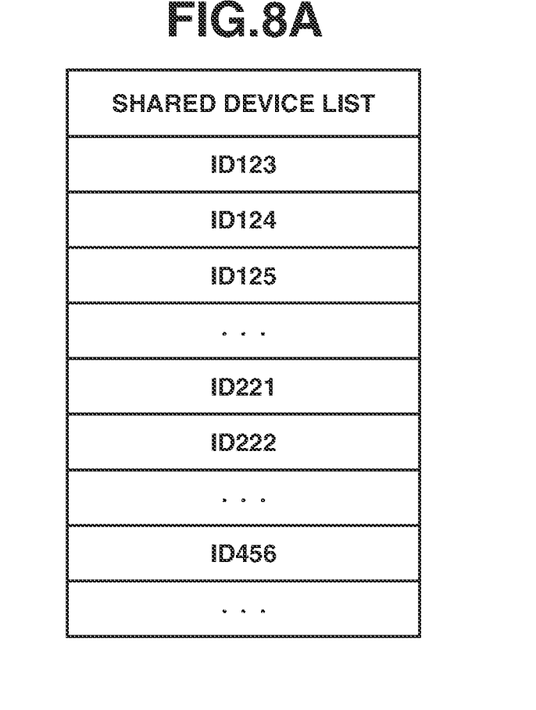
FIGS. 8A and 8B illustrate examples of a shared device list and individual device lists according to the first exemplary embodiment.
Figure 8B:
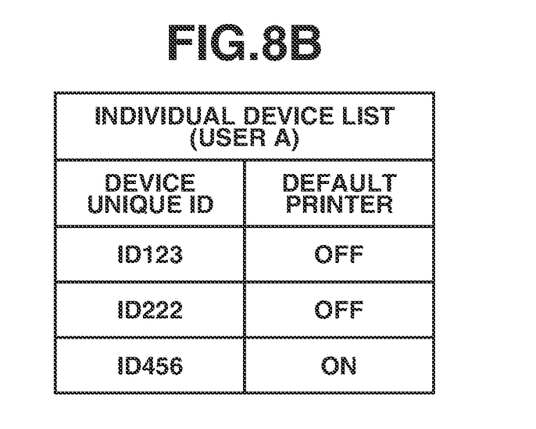

FIG. 3A illustrates a software configuration of the print server 101. A print service 301 transmits print data received from the outside to a registered printer (for example, the printer 103) via the network 104 and causes the printer to execute the print data. A file storage 302 is an area allocated in the storage unit 204 of the print server 101. The file storage 302 holds user information registered in the print service 301, information about the printers held by users, user-specific default print settings, a list of print settings, etc. These items of information are used by the print service 301. In addition, the print service 301 manages the devices that can be used therewith. Among the printers registered in the print service 301, the print service 301 manages a list of printers that can be used by all users as a shared device list, as illustrated in FIG. 8A. In addition, among the printers included in the shared device list, the print service 301 manages a list of printers that an individual user has selected to use, as an individual device list, as illustrated in FIG. 8B. The shared device list and the individual device lists are stored in the file storage 302.

Figure 3B:
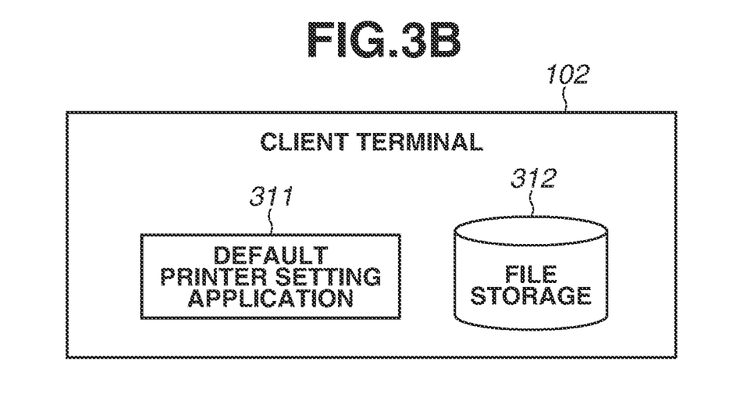

FIG. 3B is a block diagram illustrating a software configuration of the client terminal 102. A default printer setting application 311 is a software application that serves as an interface for the user, to send a default printer setting request to the print service. Specifically, the default printer setting application 311 displays a user interface (UI) (a login screen) for logging in to the print service 301 and a UI for reading a two-dimensional code on the display 216. The default printer setting application 311 also extracts a device unique identification (ID) (which is ID information for identifying a device) from the two-dimensional code read by the image reading unit 218 and transmits the default printer setting request together with the extracted device unique ID to the print server 101.

A file storage 312 is an area allocated in the storage unit 214 of the client terminal 102 for storing user files. The user can store image data read by the image reading unit 218 and the extracted device unique ID in the file storage 312. The default printer setting application 311 has the authority to access the file storage 312. In the present exemplary embodiment and the other exemplary embodiments, it is preferable that the print server be realized by a print server system constituted by at least one server.

Next, processing performed by the application 311 and the service 301 according to the present exemplary embodiment will be described with reference to FIGS. 4, 5, and 7A to 7E.

Figure 4:
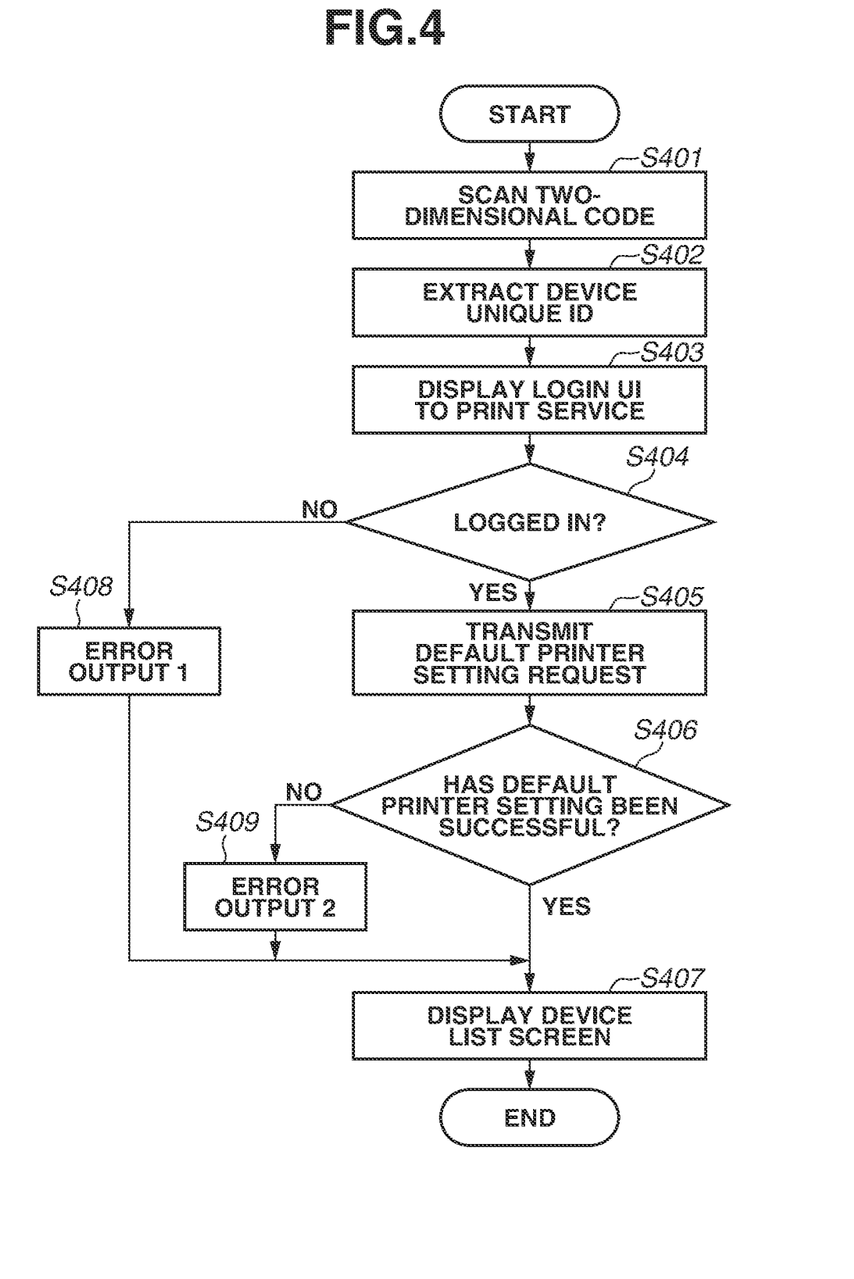
FIG. 4 is a flowchart illustrating an example of processing performed by a default printer setting application according to a first exemplary embodiment.

FIG. 4 illustrates an example of default printer setting processing performed by the client terminal 102 (the information processing apparatus).

The CPU 212 performs the processing illustrated in FIG. 4 by loading a program of the default printer setting application 311 to the memory 213. This program is stored in the storage unit 214 of the client terminal 102.

Figure 7A:
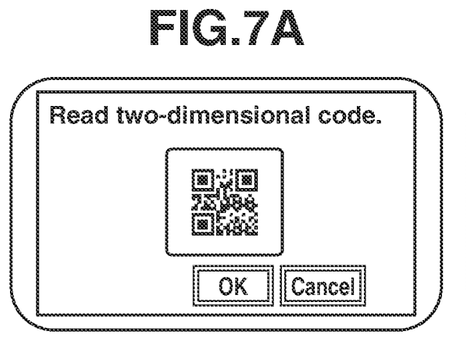
FIGS. 7A to 7E illustrate examples of a user interface (UI) of the default printer setting application according to the first exemplary embodiment.
Figure 7B:
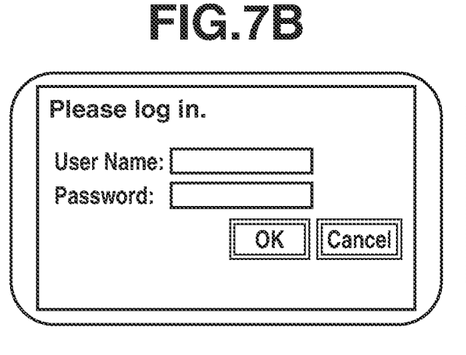

First, in step S401, the default printer setting application 311 causes the image reading unit 218 to scan a two-dimensional code that is displayed on a panel of a printer or that is attached to the housing of a printer, as illustrated in FIG. 7A. Next, in step S402, the default printer setting application 311 analyzes the image of the read two-dimensional code and extracts a device unique ID. Next, in step S403, the default printer setting application 311 displays a UI to log in to the print service 301 and requests the user to enter user information and a password, as illustrated in FIG. 7B. If the correct password corresponding to the user information is entered, the print service 301 determines that the user has successfully logged in. In step S404, the default printer setting application 311 determines whether the user has successfully logged in to the print service 301.

Figure 7C:
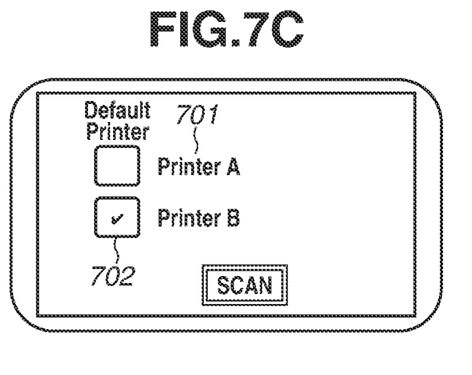
Figure 7D:
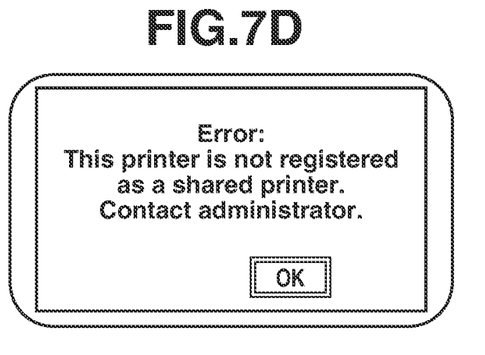

If the user has successfully logged in the print service 301 (YES in step S404), the processing proceeds to step S405. In step S405, the default printer setting application 311 receives credential information from the print service 301. As the credential information, signed data that includes an attribute, such as an identity (ID) token, of the authenticated user may be used. In addition, in step S405, the default printer setting application 311 transmits a default printer setting request together with the device unique ID and the credential information to the print server 101. In step S406, based on the response from the print server 101, the default printer setting application 311 determines whether the default printer setting has been successful. If the default printer setting has been successful (YES in step S406), the processing proceeds to step S407. In step S407, the default printer setting application 311 displays a printer list screen on the display unit 216, as illustrated in FIG. 7C. A list of the printers registered in an updated individual device list (701) and the default printer setting (702) are displayed on the printer list screen. In contrast, if the default printer setting has failed (NO in step S406), the processing proceeds to step S409. In step S409, the default printer setting application 311 displays error information on the display unit 216, as illustrated in FIG. 7D.

Figure 7E:
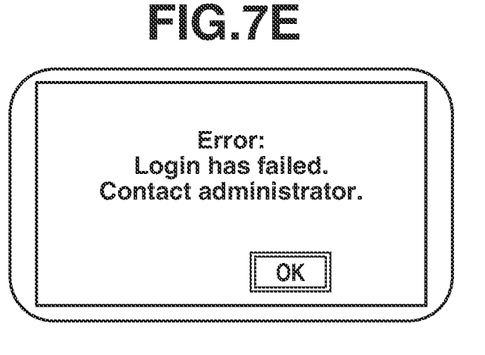

In addition, if the user has failed to log in to the print service 301 (NO in step S404), the processing proceeds to step S408. In step S408, the default printer setting application 311 displays error information on the display unit 216, as illustrated in FIG. 7E.

The default printer is a pre-selected printer. Unless the printer to be used is manually selected, the default printer is used for printing.

Figure 5:
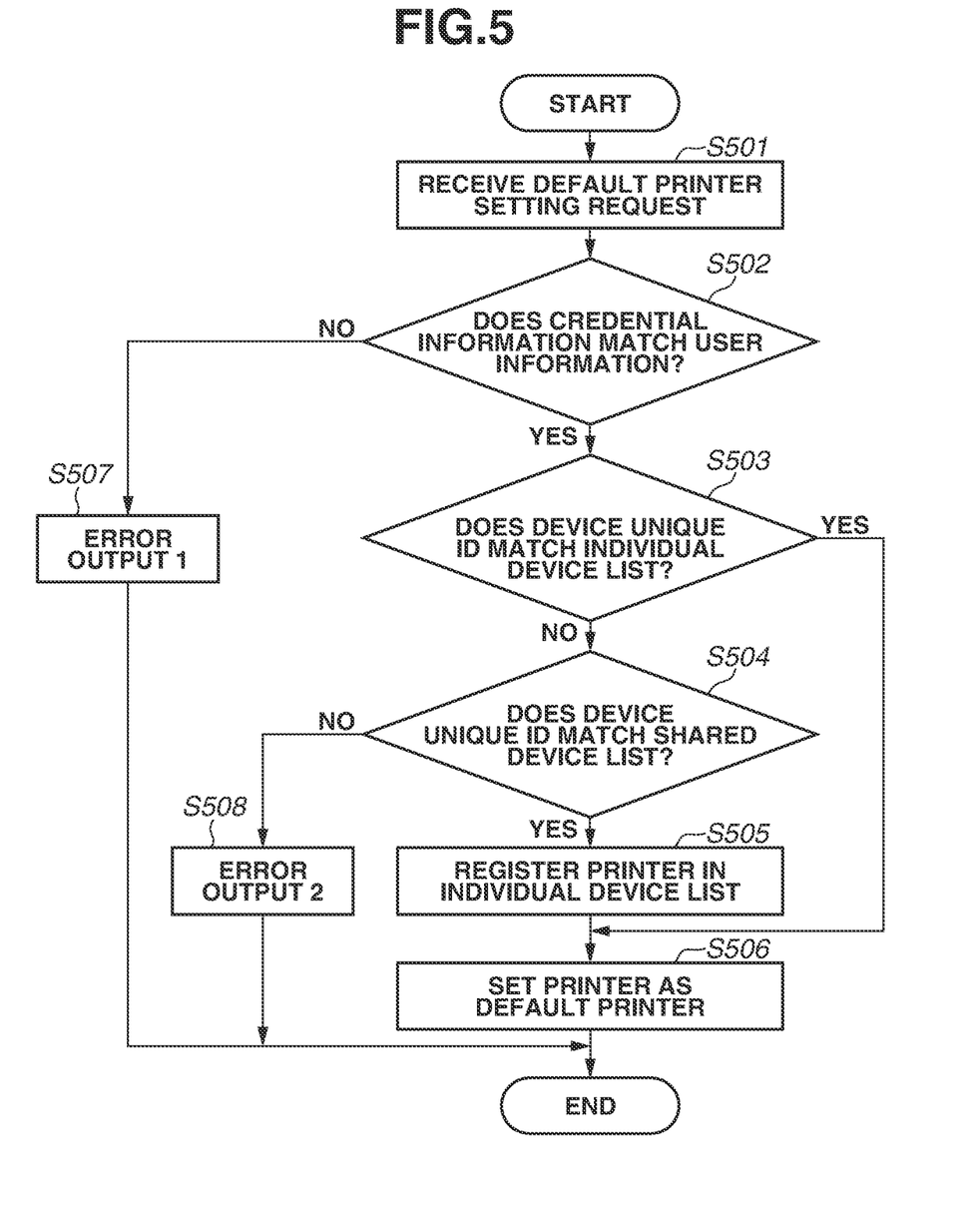
FIG. 5 is a flowchart illustrating an example of processing performed by a print service according to the first exemplary embodiment.

FIG. 5 illustrates an example of default printer setting processing performed by the print server 101.

The CPU 202 performs the processing illustrated in FIG. 5 by loading a program of the print service 301 to the memory 203. This program is stored in the storage unit 204 of the print server 101.

The print service 301 performs step S501 in FIG. 5 upon receiving a default printer setting request.

First, in step S501, the print service 301 receives a default printer setting request. Next, in step S502, the print service 301 determines whether the credential information attached to the received default printer setting request matches the user information about the user who has logged in to the print service 301. If the credential information matches the user information (YES in step S502), the processing proceeds to step S503. In step S503, the print service 301 determines whether the device unique ID attached to the received default printer setting request matches an individual device list. If the credential information does not match the user information (NO in step S502), the processing proceeds to step S507. In step S507, the print service 301 outputs error information to the client terminal 102. If the device unique ID matches any one of the device unique IDs registered in the individual device list (YES in step S503), the processing proceeds to step S506. In step S506, the print service 301 sets the printer having this matching device unique ID as a default printer.

In contrast, if none of the printers included in the individual device list have the device unique ID (NO in step S503), the processing proceeds to step S504. In step S504, the print service 301 determines whether the device unique ID matches the shared device list. If a printer matching the device unique ID is included in the shared device list (YES in step S504), the processing proceeds to step S505. In step S505, the print service 301 records the device unique ID in the individual device list for the user. In this way, a printer is registered as a device to be used per user. In step S506, the print service 301 further sets the printer having the device unique ID as a default printer. In contrast, if none of the printers in the shared device list match the device unique ID (NO in step S504), the processing proceeds to step S508. In step S508, the print service 301 outputs error information to the client terminal 102, as illustrated in FIG. 7D.

As described above, the default print application 311 of the client terminal 102 and the print service 301 of the print server 101 perform processing in cooperation with each other. As a result, based on a device unique ID of a printer, a default printer can be set per user. In addition, since the user performs the operation in front of the printer, the user does not need to memorize the name, the Internet protocol (IP) address, etc. of the target printer. This improves the convenience. Furthermore, the user does not need to reselect the target printer from the list of shared printers every time. This reduces the burden of the user operation.

As described above, according to the present exemplary embodiment, an individual user does not need to manually and explicitly select a default printer after logging-in. By simply capturing an image of a two-dimensional code displayed on a display unit of a printer, the user can set the printer as a default printer.

The first exemplary embodiment has been described based on an example in which the user sets a default printer by causing the default printer setting application 311 of the client terminal 102 to read a two-dimensional code. A second exemplary embodiment describes a method in which an administrator easily registers a printer in a shared device list.

Specific processing according to the present exemplary embodiment will be described with reference to FIGS. 6A and 6B. In the present exemplary embodiment, only the difference between the first and second exemplary embodiments will be described. Since the system configuration, the hardware/software configuration, and the processing of the second exemplary embodiment are basically the same as those of the first exemplary embodiment, redundant descriptions thereof will be avoided.

Figure 6A:
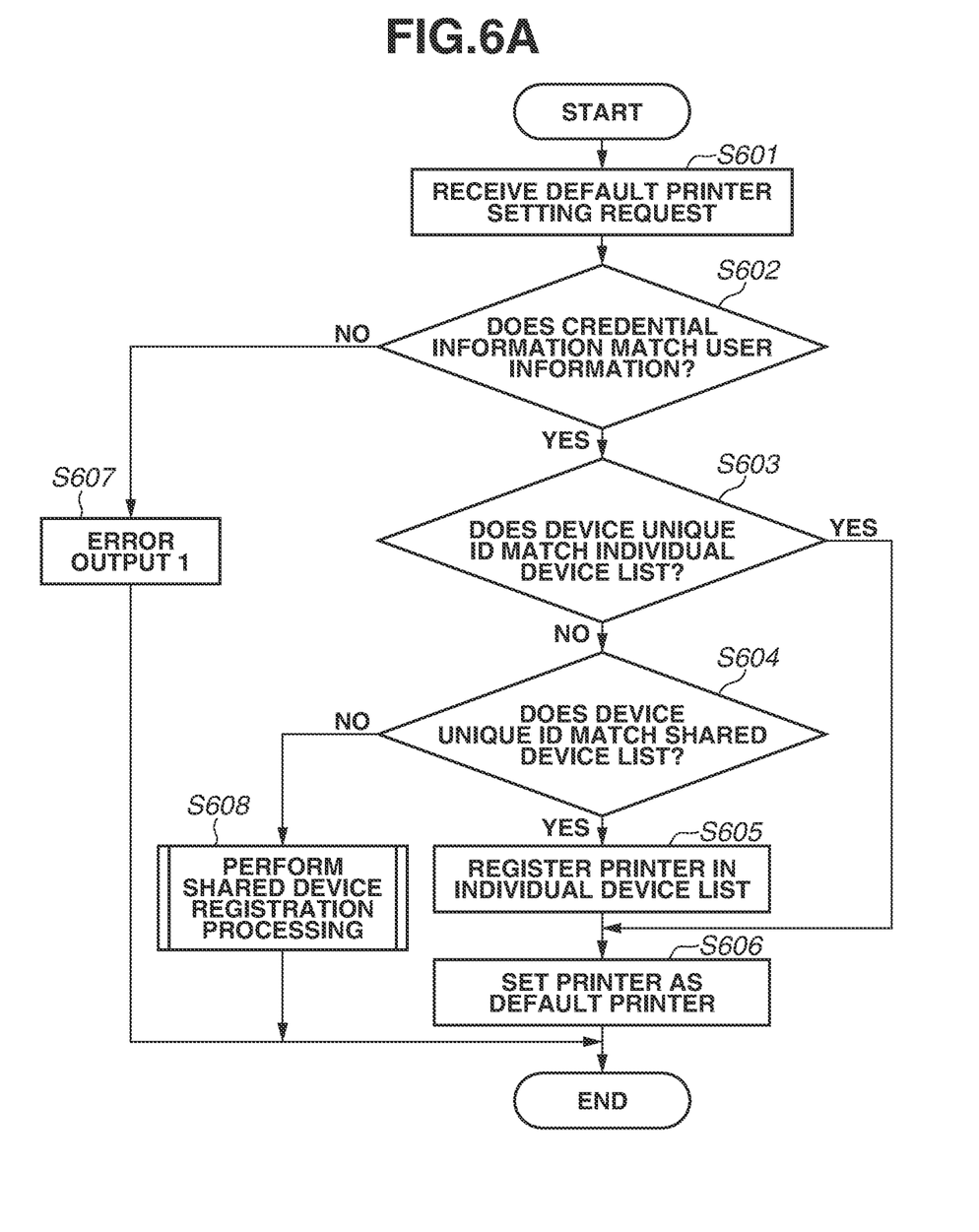
FIGS. 6A and 6B are flowcharts illustrating examples of processing performed by a print service according to a second exemplary embodiment.
Figure 6B:
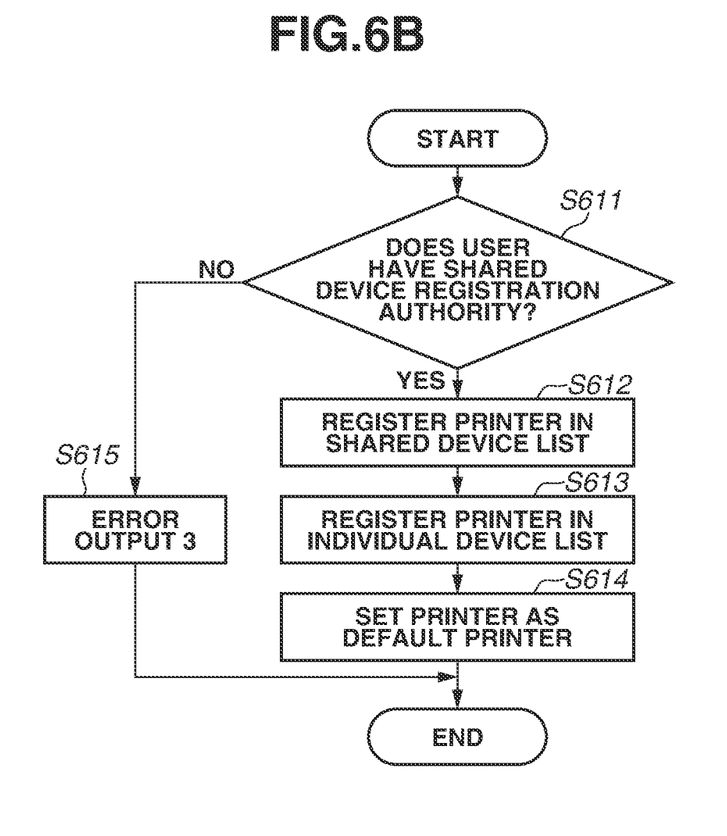

FIGS. 6A and 6B illustrate examples of processing for registration in the shared device list and default printer setting processing performed by a print server 101 according to a second exemplary embodiment.

A CPU 202 performs the processing illustrated in FIGS. 6A and 6B by loading a program of a print service 301 to a memory 203. This program is stored in a storage unit 204 of the print server 101.

The print service 301 performs step S601 in FIG. 6A upon receiving a default printer setting request.

Since steps S601 to S607 are the same as steps S501 to S507 in FIG. 5, redundant descriptions thereof will be avoided. If none of the printers in the shared device list matches the device unique ID (NO in step S604), the processing proceeds to step S608. In step S608, the print service 301 performs shared device registration processing.

FIG. 6B illustrates a specific example of the shared device registration processing.

In step S611, the print server 101 refers to the user information stored in a file storage 302 and determines whether the user has a shared device registration authority.

If the user has the shared device registration authority (YES in step S611), the processing proceeds to step S612. In step S612, the print server 101 registers the printer as a shared device by recording the device unique ID of the printer in the shared device list. Next, in step S613, the print server 101 registers the printer as a user-specific utilization device by further recording its device unique ID in the individual device list for the user. Next, in step S614, the print service 301 further sets the printer having the device unique ID as a default printer. If the user does not have the shared device registration authority (NO in step S611), the processing proceeds to step S615. In step S615, the print service 301 outputs error information to the client terminal 102.

As described above, according to the present exemplary embodiment, the print service 301 registers the printer in the shared device list and performs the setting of the default printer.

Since the user performs the operation in front of the printer, the user does not need to memorize the name, the IP address, etc. of the target printer. This improves the convenience.

In addition, the administrator of the printer can easily register a new printer in the shared device list. Thus, the burden of the printer management operation can be reduced.

The first exemplary embodiment has been described based on an example in which the user sets a default printer by causing the default printer setting application 311 of the client terminal 102 to read a two-dimensional code.

The default printer setting application may be provided in the printer 103. Namely, as will be described in a third exemplary embodiment as an example, a default printer may be set by activating a default printer setting application in a printer 103 according to the third exemplary embodiment.

Specific processing according to the present exemplary embodiment will be described with reference to FIGS. 9A, 9B, and 10. In the present exemplary embodiment, only the difference between the first and third exemplary embodiments will be described. Since the system configuration, the hardware/software configuration, and the processing are basically the same as those of the first exemplary embodiment, redundant descriptions thereof will be avoided.

Figure 9A:
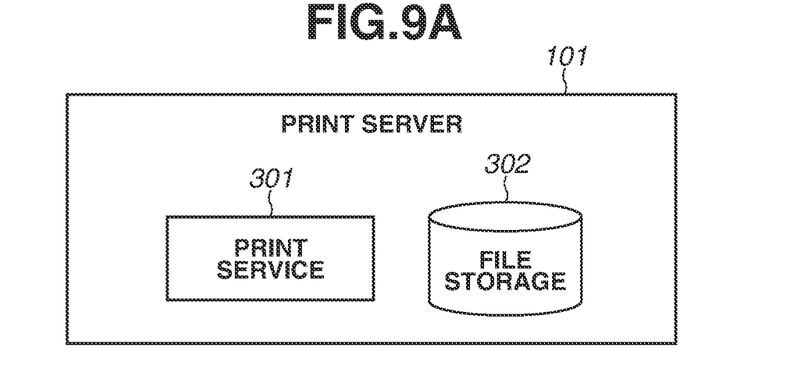
FIGS. 9A and 9B illustrate software configurations of a print server and a printer according to a third exemplary embodiment.

FIG. 9A is a block diagram illustrating a software configuration of a print server 101. Since this software configuration is the same as that of the print server 101 illustrated in FIG. 3A, redundant description thereof will be avoided.

Figure 9B:
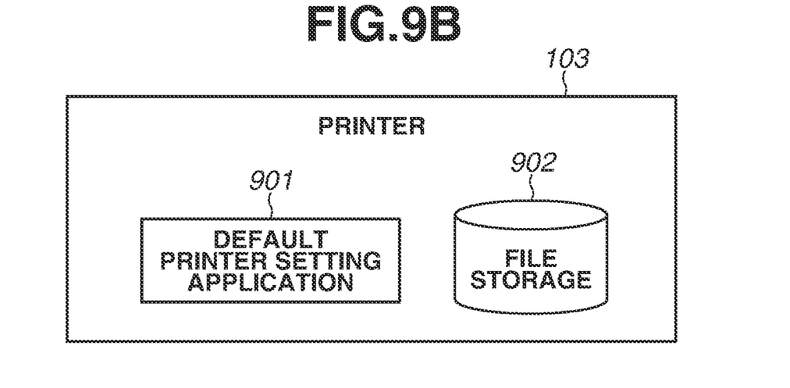

FIG. 9B is a block diagram illustrating a software configuration of a printer 103. A default printer setting application 901 is the same as the default printer setting application 311 of the client terminal 102.

A file storage 902 is an area allocated in a storage unit 224 of the printer 103 for storing user files. The user can store an acquired device unique ID in the file storage 902. The default printer setting application 901 has the authority to access the file storage 902.

Next, application processing according to the present exemplary embodiment will be described.

Figure 10:
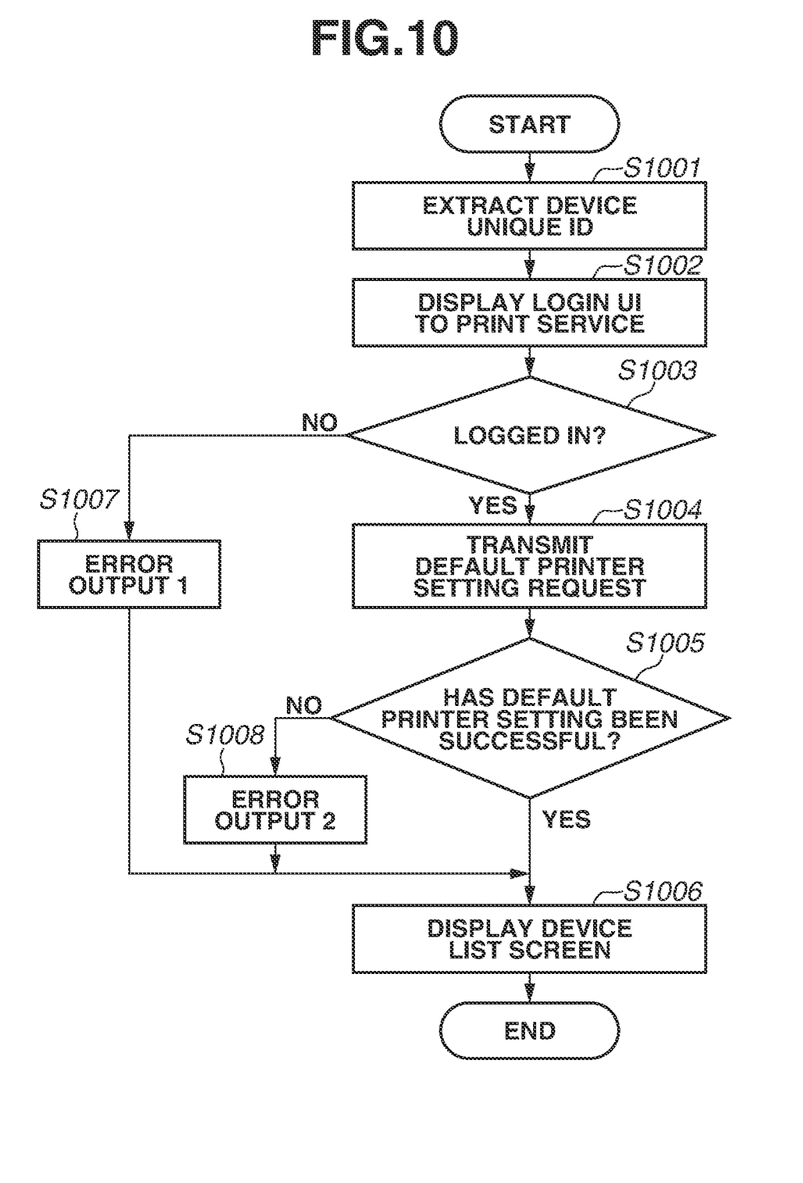
FIG. 10 is a flowchart illustrating an example of processing performed by a default printer setting application according to the third exemplary embodiment.

FIG. 10 illustrates an example of default printer processing in a case where the printer executes the default printer setting application.

A CPU 222 performs the processing illustrated in FIG. 10 by loading a program of the default printer setting application 901 to a memory 223. This program is stored in the storage unit 224 of the printer 103.

The default printer setting application 901 performs step S1001 in FIG. 10 upon being activated by the user via a UI on a panel of a printer.

In step S1001, when activated via the UI on the panel of the printer, the default printer setting application 901 acquires the device unique ID directly from the printer.

Since steps S1002 to S1008 are the same as steps S403 to S409 in FIG. 4, redundant descriptions thereof will be avoided.

As described above, according to the present exemplary embodiment, the default printer setting application 901 of the printer 103 acquires a device unique ID of a printer, and based on the acquired device unique ID of the printer, a default printer can be set per user.

In addition, the user can easily set a default printer without any client terminal.

The first exemplary embodiment has been described based on an example in which the user sets a default printer promptly by causing the default printer setting application of the client terminal 102 to read the two-dimensional code.

A fourth exemplary embodiment describes a method in which the user is asked about "whether to set the printer as a default printer". In this method, the setting is performed based on the confirmation result.

Specific processing according to the present exemplary embodiment will be described with reference to FIGS. 11 and 12. In the present exemplary embodiment, only the difference between the first and fourth exemplary embodiments will be described. Since the system configuration, the hardware/software configuration, and the processing are basically the same as those of the first exemplary embodiment, redundant descriptions thereof will be avoided.

Figure 11:
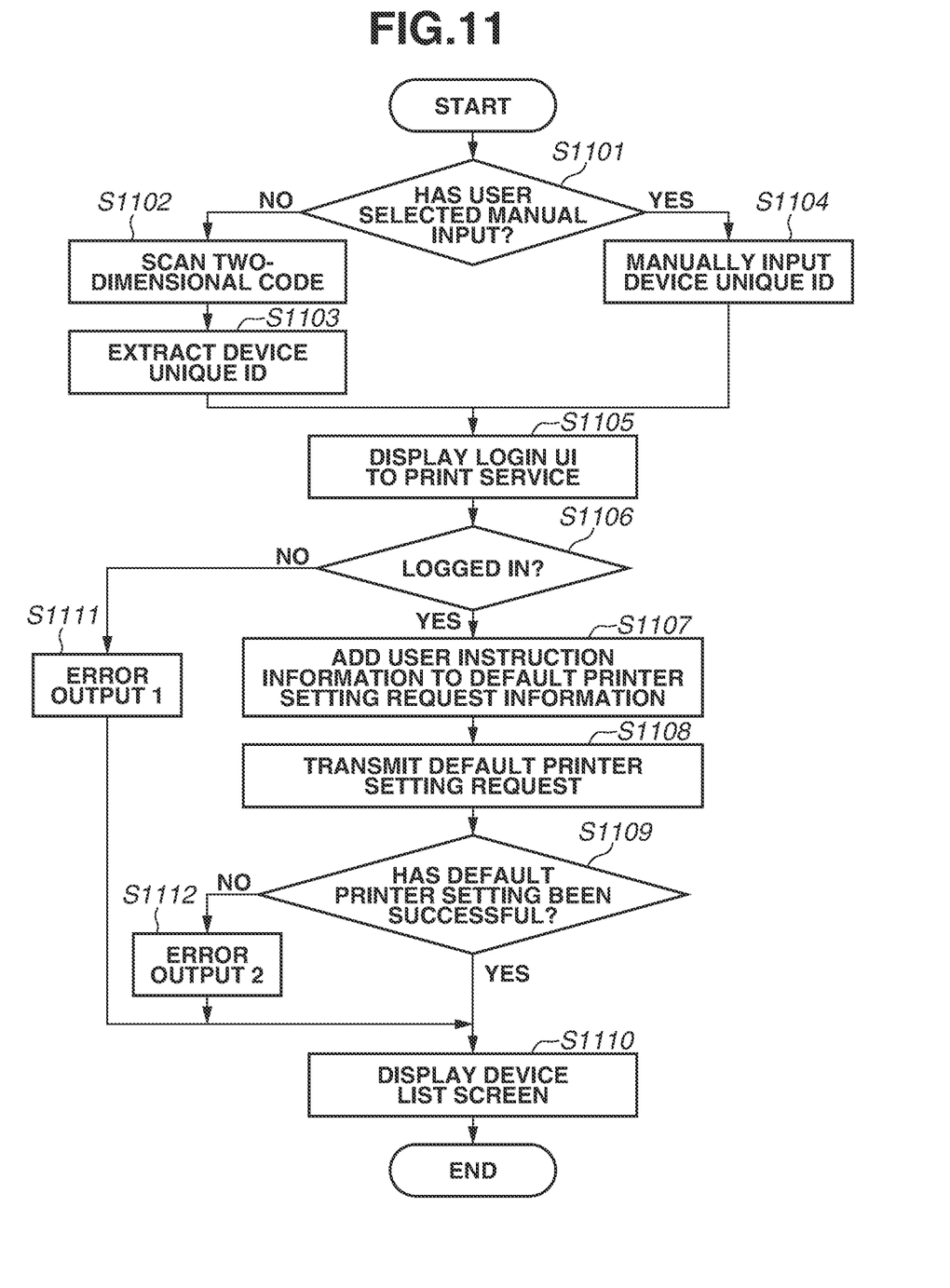
FIG. 11 is a flowchart illustrating an example of processing performed by a default printer setting application according to a fourth exemplary embodiment.

FIG. 11 illustrates an example of default printer setting processing performed by a client terminal 102.

A CPU 212 performs the processing illustrated in FIG. 11 by loading a program of a default printer setting application 311 to a memory 213. This program is stored in a storage unit 214 of the client terminal 102.

First, in step S1101, the default printer setting application 311 requests the user to enter a user instruction indicating a scan UI or a manual input UI. If the user selects the scan UI (NO in step S1101), the processing proceeds to step S1102. Since steps S1102, S1103, S1105, and S1106 are the same as steps S401 to S404, redundant descriptions thereof will be avoided. In contrast, if the user selects the manual input UI (YES in step S1101), the processing proceeds to step S1104. In step S1101, the default printer setting application 311 receives a device unique ID entered by the user. Also in this case, since steps S1105 and S1106 are the same as steps S403 and S404, redundant descriptions thereof will be avoided. If the user successfully logs in to a print service 301 (YES in step S1106), the default printer setting application 311 receives credential information from the print service 301. Next, in step S1107, the default printer setting application 311 adds the user instruction information indicating either scan input or manual input to the default printer setting request information, which includes the device unique ID and the credential information. Next, in step S1108, the default printer setting application 311 transmits a default printer setting request to a print server 101. Since steps S1109 to 1012 are the same as steps S406 to S409 in FIG. 4, redundant descriptions thereof will be avoided.

Figure 12:
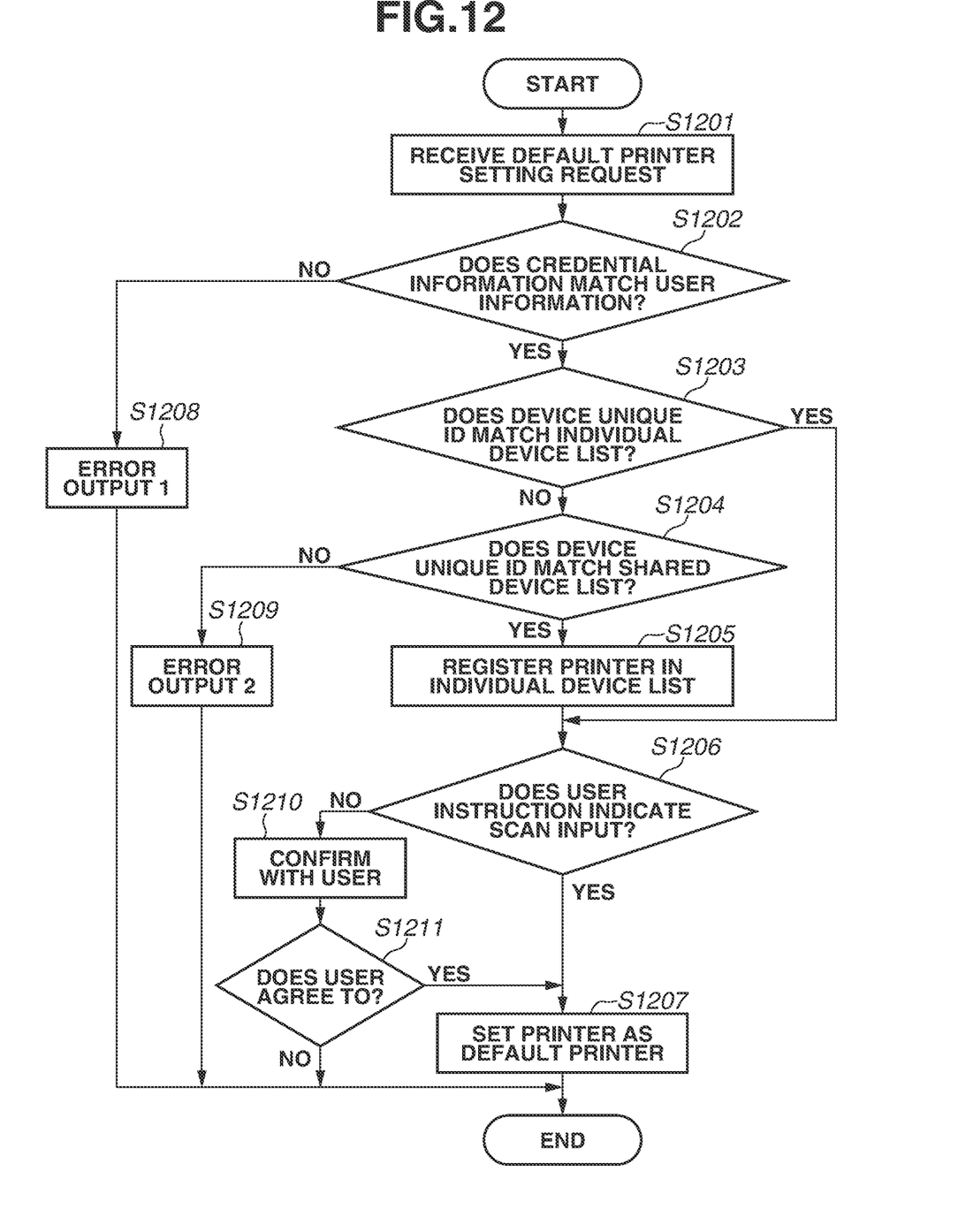
FIG. 12 is a flowchart illustrating an example of processing performed by a printer service according to the fourth exemplary embodiment.

FIG. 12 illustrates an example of default printer setting processing performed by the print server 101.

A CPU 202 performs the processing illustrated in FIG. 12 by loading a program of the print service 301 to a memory 203. This program is stored in a storage unit 204 of the print server 101.

The print service 301 performs step S1201 in FIG. 12 upon receiving a default printer setting request.

First, in step S1201, the print service 301 receives a default printer setting request.

In step S1202, the print service 301 determines whether the credential information attached to the received default printer setting request matches the user information about the user who has logged in to the print service 301. If the credential information matches the user information (YES in step S1202), the processing proceeds to step S1203. In step S1203, the print service 301 determines whether the device unique ID attached to the received default printer setting request matches an individual device list. If the credential information does not match the user information (NO in step S1202), the processing proceeds to step S1208. In step S1208, the print service 301 outputs error information to the client terminal 102. If the device unique ID matches any one of the device unique IDs registered in the individual device list (YES in step S1203), the processing proceeds to step S1206. In step S1206, the print service 301 determines whether the user instruction indicates scan input, based on the default printer setting request information. If none of the printers included in the individual device list have the device unique ID (NO in step S1203), the processing proceeds to step S1204. In step S1204, the print service 301 determines whether the device unique ID matches any printer in the shared device list. If the device unique ID matches any printer in the shared device list (YES in step S1204), the processing proceeds to step S1205. In step S1205, the print service 301 registers the printer as a user-specific utilization device by recording the device unique ID of the printer in the individual device list for the user. In step S1206, the print service 301 determines whether the user instruction indicates scan input based on the default printer setting request information. If none of the printers in the shared device list have the device unique ID (NO in step S1204), the processing proceeds to step S1209. In step S1209, the print service 301 outputs error information to the client terminal 102, as illustrated in FIG. 7D. In step S1207, If the print service 301 determines that the user instruction indicates scan input (YES in step S1206), the processing proceeds to step S1207. In step S1207, the print service 301 promptly sets the printer having the device unique ID as a default printer. In contrast, if the print service 301 determines that the user instruction indicates manual input (NO in step S1206), the processing proceeds to step S1210. In step S1210, the print service 301 confirms with the user about whether to set the printer having the device unique ID as a default printer. If the print service 301 determines that the user agrees to the setting of the default printer (YES in step S1211), the processing proceeds to step S1207. In step S1207, the print service 301 sets the printer having the device unique ID as a default printer. In contrast, if the print service 301 determines that the user does not agree to the setting of the default printer (NO in step S1211), the print service 301 ends the present processing.

As described above, according to the present exemplary embodiment, based on the determination result of whether the scan input or the manual input has been selected, the print service 301 confirms with the user about "whether to set the printer as a default printer". Depending on the result of this confirmation, the default printer setting is performed. Thus, if the scan input has been selected, namely, if it is certain that the user has operated the printer right in front, the printer can be promptly set as a default printer. In contrast, if the manual input UI has been selected, namely, if there is a possibility that the user is not in front of the printer, user confirmation is performed. In this way, it is possible to reduce erroneous operations without sacrificing the user convenience.

Other Embodiments

The present disclosure includes supplying a program that realizes at least one function of the above exemplary embodiments to a system or an apparatus via a network or a storage medium and causing at least one processor of a computer of the system or the apparatus to read and execute the program. Alternatively, the present disclosure includes a circuit (for example, an application specific integrated circuit (ASIC)) that realizes at least one function of the above exemplary embodiments.

Other Embodiments

Embodiment(s) of the present disclosure includes a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014209, filed Jan. 30, 2020, which is hereby incorporated by reference herein in its entirety.

What is claimed is:

1. An information processing apparatus comprising:
a controller including a processor and a memory, the controller configured to:
acquire user identification information that identifies a user;
acquire printer identification information that identifies a printer from a barcode that includes the printer identification information and that has been captured; and
in order to set the printer as a default printer for the user in a server system, transmit the printer identification information and the user identification information to the server system in which the printer identification information identifying the printer and other printer identification information identifying other printers have been previously registered on a condition that the printer and the other printers are able to be used by the user.

2. The information processing apparatus according to claim 1, wherein the barcode is a two-dimensional barcode displayed on a display of the printer and captured by the information processing apparatus.

3. The information processing apparatus according to claim 1,
wherein the information processing apparatus transmits user information to the server system, and
wherein the printer is registered as the default printer used by a user corresponding to the user information in the server system.

4. The information processing apparatus according to claim 3,
wherein the controller is further configured to cause the information processing apparatus to:
display a login screen for logging in to the server system on a display of the information processing apparatus; and
receive user information and a password entered on the login screen, and
wherein, in a case where a correct password corresponding to the user information is entered, the printer is registered as the default printer used by the user corresponding to the user information.

5. A printer comprising:
a controller including a processor and a memory, the controller configured to:
transmit printer identification information that identifies the printer from a barcode that includes the printer identification information and that has been captured and user identification information that identifies a user to a server system in which the printer identification information identifying the printer and other printer identification information identifying other printers have been previously registered on a condition that the printer and the other printers are able to be used by the user; and
in order to set the printer as a default printer for the user in the server system, transmit a default printer setting request to the server system.

6. A control method of an information processing apparatus, the control method comprising:
acquiring user identification information that identifies a user;
acquiring printer identification information that identifies a printer from a barcode that includes the printer identification information and that has been captured; and
in order to set the printer as a default printer for the user in a server system, transmitting the printer identification information and the user identification information to the server system in which the printer identification information identifying the printer and other printer identification information identifying other printers have been previously registered on a condition that the printer and the other printers are able to be used by the user.

7. The control method according to claim 6, wherein the barcode is a two-dimensional barcode displayed on a display of the printer and captured by the information processing apparatus.

8. The control method according to claim 6, further comprising:
transmitting user information to the server system,
wherein the printer is registered as the default printer used by a user corresponding to the user information in the server system.

9. The control method according to claim 8, further comprising:
displaying a login screen for logging in to the server system on a display of the information processing apparatus; and
receiving user information and a password entered on the login screen,
wherein, in a case where a correct password corresponding to the user information is entered, the printer is registered as the default printer used by the user corresponding to the user information.

* * * * *